(12) United States Patent
Geller et al.

(10) Patent No.: US 10,683,002 B2
(45) Date of Patent: Jun. 16, 2020

(54) EFFICIENT ACCELERATION FROM SURROUNDING VEHICLES

(71) Applicant: Toyota Motor Engineering & Manufacturing North America, Inc., Erlanger, KY (US)

(72) Inventors: Benjamin M. Geller, Ann Arbor, MI (US); Geoffrey D. Gaither, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 302 days.

(21) Appl. No.: 15/635,048

(22) Filed: Jun. 27, 2017

(65) Prior Publication Data
US 2018/0370523 A1    Dec. 27, 2018

(51) Int. Cl.
*B60W 20/15*      (2016.01)
*B60W 10/06*      (2006.01)
(Continued)

(52) U.S. Cl.
CPC ............ *B60W 20/15* (2016.01); *B60W 10/06* (2013.01); *B60W 10/08* (2013.01); *B60W 10/10* (2013.01);
(Continued)

(58) Field of Classification Search
CPC .............. B60L 11/1851; Y10S 903/93; B60W 2556/65; B60W 2050/0088; B60W 2050/0089; B60W 2510/244; B60W 2520/10; B60W 2540/30; B60W 2710/1005; B60W 2720/106; B60W 20/11; B60W 20/12; B60W 20/30; B60W 20/15; B60W 10/06; B60W 10/08; B60W 10/10;
(Continued)

(56) References Cited

U.S. PATENT DOCUMENTS 6,765,495 B1 * 7/2004 Dunning ................ G08G 1/161
                                                               340/435
7,301,302 B2 * 11/2007 Yoshii ...................... B60K 6/26
                                                               320/104
(Continued)

FOREIGN PATENT DOCUMENTS

DE             2555429           6/1977

*Primary Examiner* — Anthony R Jimenez
(74) *Attorney, Agent, or Firm* — Snell & Wilmer LLP

(57) ABSTRACT

A system for increasing efficiency of a current vehicle includes a power source designed to generate power to propel the current vehicle and a distance sensor designed to detect multiple distance measurements each corresponding to a distance from the current vehicle to a reference vehicle. The system also includes an electronic control unit (ECU) coupled to the power source and the distance sensor and designed to determine an acceleration or deceleration rate of the reference vehicle based on the multiple distance measurements. The ECU is also designed to predict a forthcoming acceleration or deceleration rate of the current vehicle based on the determined acceleration rate or the determined deceleration rate of the reference vehicle. The ECU is also designed to change operation of the power source to increase efficiency of the power source based on the predicted forthcoming acceleration or deceleration rate of the current vehicle.

22 Claims, 4 Drawing Sheets

(51) Int. Cl.

| | |
|---|---|
| *B60W 10/08* | (2006.01) |
| *B60W 10/10* | (2012.01) |
| *B60W 30/16* | (2020.01) |
| *B60W 20/30* | (2016.01) |
| *B60W 20/12* | (2016.01) |
| *B60W 20/11* | (2016.01) |
| *B60W 30/188* | (2012.01) |
| *B60W 50/00* | (2006.01) |
| *B60W 50/08* | (2020.01) |

(52) U.S. Cl.
CPC ............ *B60W 20/11* (2016.01); *B60W 20/12* (2016.01); *B60W 20/30* (2013.01); *B60W 30/16* (2013.01); *B60W 30/188* (2013.01); *B60W 30/1882* (2013.01); *B60W 50/0097* (2013.01); *B60W 50/085* (2013.01); *B60W 2050/0088* (2013.01); *B60W 2050/0089* (2013.01); *B60W 2510/244* (2013.01); *B60W 2520/10* (2013.01); *B60W 2540/30* (2013.01); *B60W 2554/4041* (2020.02); *B60W 2554/80* (2020.02); *B60W 2554/801* (2020.02); *B60W 2554/804* (2020.02); *B60W 2556/65* (2020.02); *B60W 2710/1005* (2013.01); *B60W 2720/106* (2013.01); *B60Y 2200/92* (2013.01); *Y10S 903/93* (2013.01)

(58) Field of Classification Search
CPC ............... B60W 30/16; B60W 30/188; B60W 30/1882; B60W 50/0097; B60W 50/085; B60W 2554/4041; B60W 2554/804; B60Y 2200/92
USPC .......................................................... 701/22
See application file for complete search history.

(56) References Cited

U.S. PATENT DOCUMENTS

| | | | |
|---|---|---|---|
| 7,826,970 | B2 | 11/2010 | Kobayashi et al. |
| 7,848,884 | B2 | 12/2010 | Kawasaki |
| 8,527,171 | B2 | 9/2013 | Sugano et al. |
| 8,643,506 | B2 | 2/2014 | Yamada et al. |
| 8,666,631 | B2 | 3/2014 | Takagi et al. |
| 8,775,060 | B2 | 7/2014 | Solyom et al. |
| 8,996,294 | B2 | 3/2015 | Kurata et al. |
| 9,145,147 | B1 | 9/2015 | Lu et al. |
| 9,174,550 | B2 | 11/2015 | Koshizen et al. |
| 9,387,857 | B2 | 7/2016 | Fairgrieve et al. |
| 9,428,160 | B2 | 8/2016 | Udaka et al. |
| 9,452,754 | B2 | 9/2016 | Clarke et al. |
| 9,493,089 | B2 * | 11/2016 | Shin ..................... B60L 11/1851 |
| 9,545,911 | B2 | 1/2017 | Kim |
| 2013/0297196 | A1 | 11/2013 | Shida |
| 2018/0105186 | A1 * | 4/2018 | Motomura ............ B60W 50/14 |

* cited by examiner

EFFICIENT ACCELERATION FROM SURROUNDING VEHICLES

BACKGROUND

1. Field

The present disclosure relates to systems and methods for predicting upcoming accelerations and decelerations based on behavior of surrounding vehicles and for increasing vehicle efficiency based on the predictions.

2. Description of the Related Art

Vehicle manufacturers have been researching and implementing systems to improve vehicle efficiency. Improving vehicle efficiency provides multiple advantages such as reduced fuel emissions in the environment, reduced costs of operating a vehicle, and increased vehicle appeal to name a few. Multiple methods have been discovered for improving vehicle efficiency. One such method controls operation of climate control settings of the vehicle to reduce power consumption during vehicle acceleration. Another such method is the use of hybrid vehicles to recapture energy that is typically lost during vehicle deceleration.

As autonomous vehicles and vehicle functions are becoming more widespread, vehicles are being designed to include more and more sensors. For example, a typical vehicle may be provided with cameras, radar sensors, and the like. Additionally, vehicle to vehicle (V2V) communications are increasing in popularity. With the increase in vehicle sensors and vehicle to vehicle communications, vehicles are capable of detecting and receiving much more information than in previous times.

Accordingly, it is desirable to be able to use such detected and received information to increase vehicle efficiency.

SUMMARY

Described herein is a system for increasing efficiency of a current vehicle. The system includes a power source designed to generate power to propel the current vehicle. The system also includes a distance sensor designed to detect multiple distance measurements each corresponding to a distance from the current vehicle to a reference vehicle. The system also includes an electronic control unit (ECU) coupled to the power source and the distance sensor. The ECU is designed to determine an acceleration rate or a deceleration rate of the reference vehicle based on the multiple distance measurements. The ECU is also designed to predict a forthcoming acceleration rate or a forthcoming deceleration rate of the current vehicle based on the determined acceleration rate or the determined deceleration rate of the reference vehicle. The ECU is also designed to change operation of the power source to increase efficiency of the power source based on the predicted forthcoming acceleration rate or the predicted forthcoming deceleration rate of the current vehicle.

Also described is a method for increasing efficiency of a current vehicle. The method includes generating, by a power source, power to propel the current vehicle. The method also includes detecting, by a distance sensor, multiple distance measurements each corresponding to a distance from the current vehicle to a reference vehicle. The method also includes determining, by the ECU, an acceleration rate or a deceleration rate of the reference vehicle based on the multiple distance measurements. The method also includes predicting, by the ECU, a forthcoming acceleration rate or a forthcoming deceleration rate of the current vehicle based on the determined acceleration rate or the determined deceleration rate of the reference vehicle. The method also includes changing, by the ECU, operation of the power source to increase efficiency of the power source based on the predicted forthcoming acceleration rate or the predicted forthcoming deceleration rate of the current vehicle.

Also disclosed is a system for increasing efficiency of a current vehicle. The system includes a power source designed to generate power to propel the current vehicle. The system also includes a vehicle-to-vehicle (V2V) network access device designed to receive a current acceleration rate or a current deceleration rate of a reference vehicle from the reference vehicle. The system also includes an electronic control unit (ECU) coupled to the power source and the V2V network access device. The ECU is designed to predict a forthcoming acceleration rate or a forthcoming deceleration rate of the current vehicle based on the received current acceleration rate or the received current deceleration rate of the reference vehicle. The ECU is also designed to change operation of the power source to increase efficiency of the power source based on the predicted forthcoming acceleration rate or the predicted forthcoming deceleration rate of the current vehicle.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for predicting a forthcoming acceleration of a current vehicle and improving efficiency of the current vehicle based on the predicted forthcoming acceleration. An exemplary system includes a power source, such as one or more of an engine or a motor generator. The system also includes a distance sensor capable of detecting a distance from the current vehicle to a reference vehicle and a speed sensor capable of detecting a current speed of the current vehicle. The system also includes an electronic control unit (ECU). The ECU may receive multiple distance measurements from the distance sensor each corresponding to a distance between the current vehicle and the reference vehicle. The ECU may determine an acceleration of the reference vehicle based on the multiple distance measurements and the current speed of the current vehicle. The ECU may use the determined acceleration of the reference vehicle to predict a forthcoming acceleration of the current vehicle. The ECU may then control the power source to efficiently prepare for the predicted forthcoming acceleration.

The systems and methods provide several benefits and advantages such as improved vehicle efficiency. Because the ECU can predict a forthcoming acceleration of the vehicle, the ECU can prepare the power source of the vehicle to most efficiently handle the forthcoming acceleration. The ECU may select the reference vehicle based on multiple criteria such as a distance between the current vehicle and a reference vehicle, whether the reference vehicle is traveling in a same lane as the current vehicle, or the like. This provides the advantage of allowing selection of a reference vehicle that is most likely to result in an accurate prediction. The ECU may further consider previously detected driver behavior along with capabilities of the current vehicle when predicting the forthcoming acceleration. Consideration of these factors in addition to the determined acceleration of the reference vehicle advantageously reduces the likelihood of an inaccurate prediction.

The systems may advantageously be used in any type of vehicle including a hybrid vehicle, an engine only vehicle, an electric only vehicle, and the like. The systems may be used in vehicles operated by a driver as well as autonomous vehicles. Use of the systems in autonomous vehicles is advantageous because the ECU of the autonomous vehicle may use information from surrounding vehicles to learn whether an acceleration is forthcoming, and may use this information to prepare the power source to handle the acceleration in an efficient manner.

Figure 1:
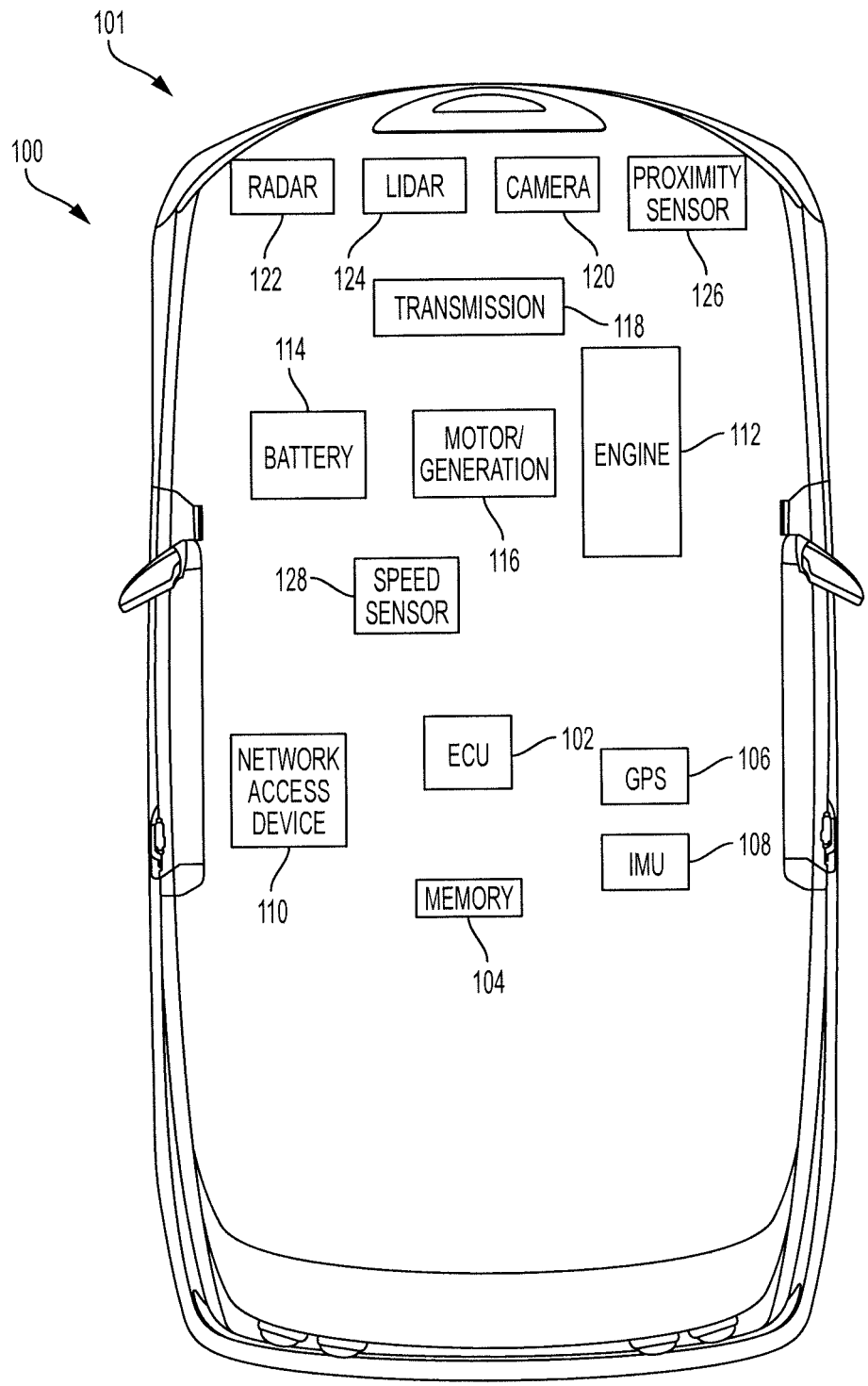
FIG. 1 is a block diagram of a vehicle having a system for predicting a forthcoming acceleration and controlling a power source to improve vehicle efficiency based on the predicted forthcoming acceleration according to an embodiment of the present invention.

Turning to FIG. 1, a vehicle 100 includes components of a system 101 for improving efficiency of the vehicle 100. The vehicle 100 includes an ECU 102, a memory 104, a global positioning system (GPS) sensor 106, an inertial measurement unit (IMU) sensor 108, and a network access device 110. The vehicle 100 further includes a power source which may include one or more of an engine 112 or a combination of a battery 114 and motor-generator 116.

The vehicle 100 may further include a transmission 118 for applying mechanical power from the engine 112 or the motor-generator 116 to wheels to propel the vehicle 100.

The vehicle 100 further includes one or more sensors including a camera 120, a radio detection and ranging (radar) sensor 122, a light imaging, detection, and ranging (LIDAR) sensor 124, a proximity sensor 126, and a speed sensor 128.

The ECU 102 may be coupled to each of the components of the vehicle 100 and may include one or more processors or controllers, which may be specifically designed for automotive systems. The functions of the ECU 102 can be implemented in a single ECU or in multiple ECUs. The ECU 102 may receive data from components of the vehicle 100, may make determinations based on the received data, and may control the operations of components based on the determinations.

The memory 104 may include any non-transitory memory known in the art. In that regard, the memory 104 may store machine-readable instructions usable by the ECU 102 and may store other data as requested by the ECU 102.

The GPS sensor 106 may be capable of detecting location data corresponding to a location of the vehicle 100. The IMU sensor 108 may detect a velocity or an orientation of the vehicle 100. One or both of the GPS sensor 106 or the IMU sensor 108 may be referred to as a location sensor and may be used to determine a current location, heading, and/or orientation of the vehicle 100. In some embodiments, one or both of the GPS sensor 106 or the IMU sensor 108 may be capable of detecting a speed of the vehicle 100 and may thus be referred to as a speed sensor.

The speed sensor 128 may be any speed sensor capable of detecting data usable to determine a speed of the vehicle 100. For example, the speed sensor 128 may include a GPS sensor or an IMU sensor, as mentioned above. The speed sensor 128 may also or instead include an angular velocity sensor configured to detect an angular velocity of the wheels of the vehicle 100 or the engine, a speedometer, or the like.

The network access device 110 may include any port or device capable of communicating via a wired or wireless interface such as Wi-Fi, Bluetooth, a cellular protocol, vehicle to vehicle communications, or the like. For example, the ECU 102 may control the network access device 110 to communicate with the cloud, an external vehicle, or any other object or device. In particular, the network access device 110 may communicate directly or indirectly with another vehicle. In that regard, the network access device 110 may communicate via a vehicle to vehicle (V2V) protocol and may thus be referred to as a V2V network access device. In some embodiments, the network access device 110 may receive a current vehicle speed or a current acceleration or deceleration of a nearby vehicle.

The engine 112 may convert a fuel into mechanical power. In that regard, the engine 112 may be a gasoline engine, a diesel engine, a fuel cell engine, or the like.

The battery 114 may store electrical energy. The motor-generator 116 may convert the electrical energy stored in the battery into mechanical power usable by the transmission 118. The motor-generator 116 may further convert mechanical power received from the transmission 118 into electrical power, which may be stored in the battery 114 as energy and/or used by other components of the vehicle 100.

The transmission 118 may be coupled to the engine 112 and the motor-generator 116. The transmission 118 may include a power splitter and may transfer mechanical power received from one or both of the engine 112 and the motor-generator 116 to wheels of the vehicle 100. The transmission 118 may control how much mechanical power is transferred from each of the engine 112 and the motor-generator 116. For example, the ECU 102 may control the transmission 118 to achieve a desired power transfer from each of the engine 112 and the motor-generator 116. The transmission 118 may further transfer mechanical energy received from one or both of the engine 112 or wheels of the vehicle 100 to the motor-generator 116 for conversion into electrical power.

Although the present discussion is related to the vehicle 100 having a hybrid power source, one skilled in the art will realize that a vehicle may include any one or combination of an engine, a fuel cell engine, a motor generator and a battery, or the like without departing from the present disclosure.

The camera 120 may include one or more camera oriented in such a manner as to be able to detect image data corresponding to an environment of the vehicle 100. For example, the camera 120 may be positioned on a front of the vehicle 100 and may be capable of detecting image data corresponding to a nearby vehicle.

The radar sensor 122 may include one or more radar device oriented in such a manner as to be able to detect radar data corresponding to an environment of the vehicle 100. For example, the radar sensor 122 may transmit a radar beam, receive a reflection of the radar beam, and analyze the reflection of the radar beam to determine the presence and characteristics of objects in the environment of the vehicle 100, such as a nearby vehicle.

The LIDAR sensor 124 may include one or more LIDAR device oriented in such a manner as to be able to detect LIDAR data corresponding to an environment of the vehicle 100. For example, the LIDAR sensor 124 may transmit light, receive a reflection of the light, and analyze the reflection of the light to determine the presence and characteristics of objects in the environment of the vehicle 100, such as a nearby vehicle.

The proximity sensor 126 may include any type of proximity sensor capable of detecting a distance measurement from the vehicle 100 to another vehicle. For example, the proximity sensor 126 may include any type of proximity sensor such as inductive, capacitive, photoelectric, ultrasonic, or the like.

Inclusion of the camera 120, the radar sensor 122, the LIDAR sensor 124, and the proximity sensor 126 may be advantageous as the camera 120 may be best suited to detect data in some environmental conditions, the radar sensor 122 may be best suited to detect data in other environmental conditions, the LIDAR sensor 124 may be best suited to detect data in other environmental conditions, and the proximity sensor 126 may be best suited to detect data in yet other environmental conditions. In some embodiments, a vehicle may include one or any combination of the camera 120, the radar sensor 122, the LIDAR sensor 124, or the proximity sensor 126.

One or more of the camera 120, the radar sensor 122, the LIDAR sensor 124, or the proximity sensor 126 may detect data corresponding to another vehicle. For example, one or more of the camera 120, the radar sensor 122, the LIDAR sensor 124, or the proximity sensor 126 may detect multiple distance measurements from the vehicle 100 to a second vehicle. In that regard, the camera 120, the radar sensor 122, the LIDAR sensor 124, and the proximity sensor 126 may each be referred to as a distance sensor.

The ECU 102 may receive the multiple distance measurements from the distance sensor, and may also receive a current speed of the vehicle 100 from the speed sensor 128. Based on the multiple distance measurements and the current speed of the vehicle 100, the ECU 102 may determine whether a reference vehicle (such as a vehicle located in front of the vehicle 100) is accelerating or decelerating. The ECU 102 may then predict that the vehicle 100 will accelerate or decelerate based on the determined acceleration or deceleration of the reference vehicle.

In some embodiments, a processor or other controller at a location remote from the vehicle 100 may receive the various measurements and detected data and determine whether the reference vehicle is accelerating or decelerating. In some embodiments, the remote processor or controller may also determine the acceleration rate or the deceleration rate of the reference vehicle. In some embodiments, the remote processor or controller may also predict that the vehicle 100 will accelerate or decelerate based on the determined acceleration or deceleration of the reference vehicle. The ECU 102 may receive this information from the remote processor or controller.

The ECU 102 may use the predicted acceleration or deceleration of the vehicle 100 to increase efficiency of the power source. The ECU 102 may control one or more of the engine 112, the battery 114, the motor-generator 116, or the transmission 118 based on the prediction. For example, the ECU 102 may predict that a driver of the vehicle 100 will accelerate the vehicle 100 to 65 miles per hour (mph) based on a determination that a reference vehicle in front of the vehicle 100 has accelerated to 65 mph. When the ECU 102 predicts that the vehicle 100 will accelerate, the ECU 102 may control the power source to prepare for such acceleration. Such preparation may be performed in order to improve or enhance efficiency of the power source.

Figure 2:
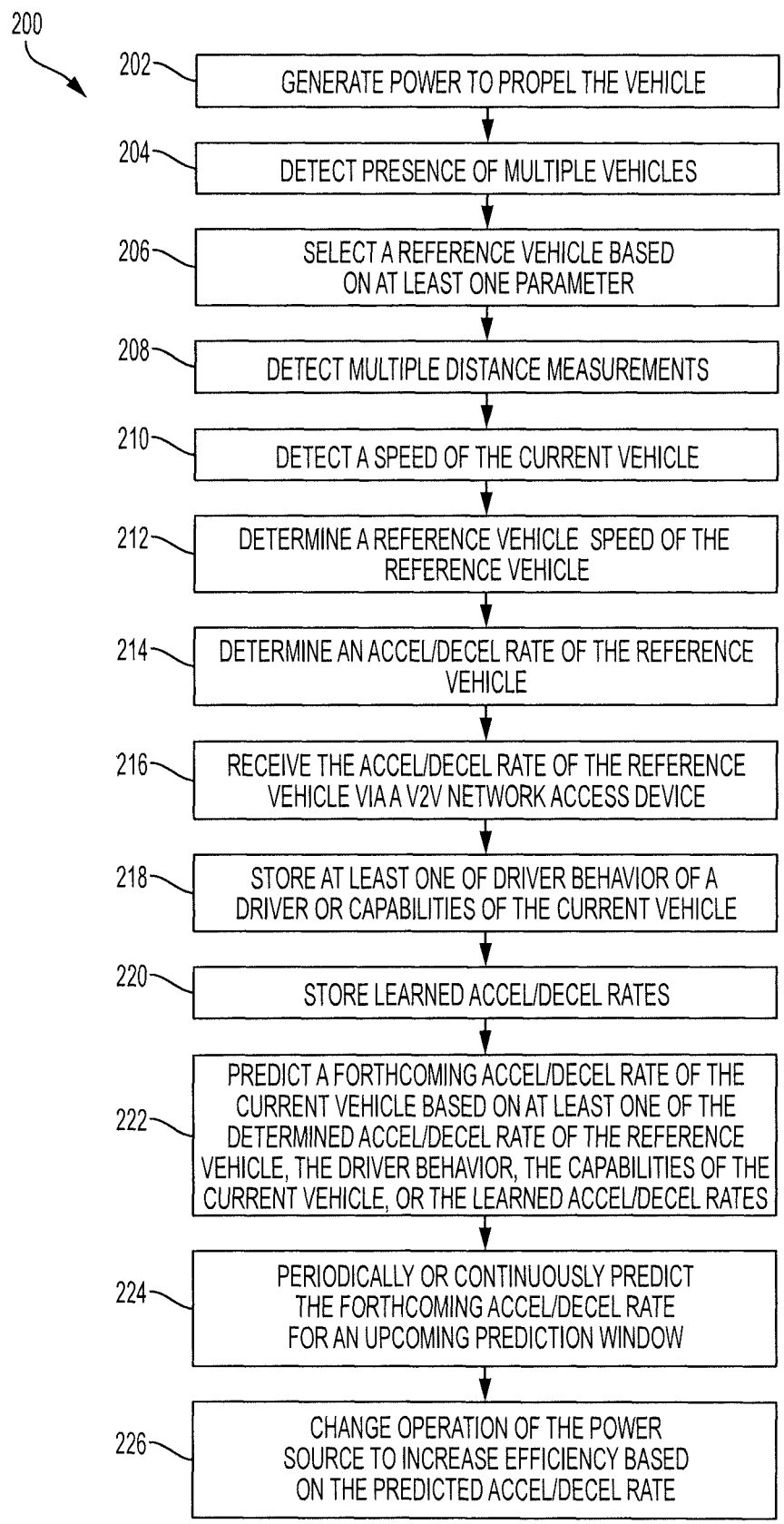
FIG. 2 is a flowchart illustrating a method for predicting a forthcoming acceleration of a vehicle and controlling a power source of the vehicle to improve vehicle efficiency based on the predicted forthcoming acceleration according to an embodiment of the present invention.

Turning to FIG. 2, a method 200 for increasing efficiency of a power source of a vehicle based on a determined acceleration or deceleration of a reference vehicle is shown. The method 200 may be performed by components of an electric only vehicle, an engine only vehicle, a fuel cell only vehicle, a hybrid vehicle such as the vehicle 100 of FIG. 1, or the like.

In block 202, a power source of a current vehicle (i.e., the vehicle which is performing the method 200) may generate power to propel the vehicle. As described above, the power source may include one or more of an engine, a fuel cell engine, a motor generator, a battery, or the like.

In block 204, a distance sensor may detect the presence of one or more vehicle near the current vehicle. In some embodiments, the distance sensor may be oriented in such a manner as to detect data corresponding to vehicles that are in front of the current vehicle. This may be beneficial because behavior of a leading vehicle may better represent a forthcoming behavior of the current vehicle than behavior of a vehicle that is parallel to or behind the current vehicle. In some embodiments, the distance sensor may detect the presence of multiple vehicles within a predetermined distance or area of the current vehicle.

In block 206, an ECU of the current vehicle may select a reference vehicle based on at least one parameter. The parameter may include, for example, whether the second vehicle is in front of the current vehicle, whether the second vehicle is in a same lane as the current vehicle, whether the second vehicle is traveling in the same or a similar direction as the current vehicle, whether the second vehicle is farther in front of the current vehicle than other vehicles, whether the reference vehicle is capable of continuously detecting distance measurements to the second vehicle, or the like.

Figure 3:
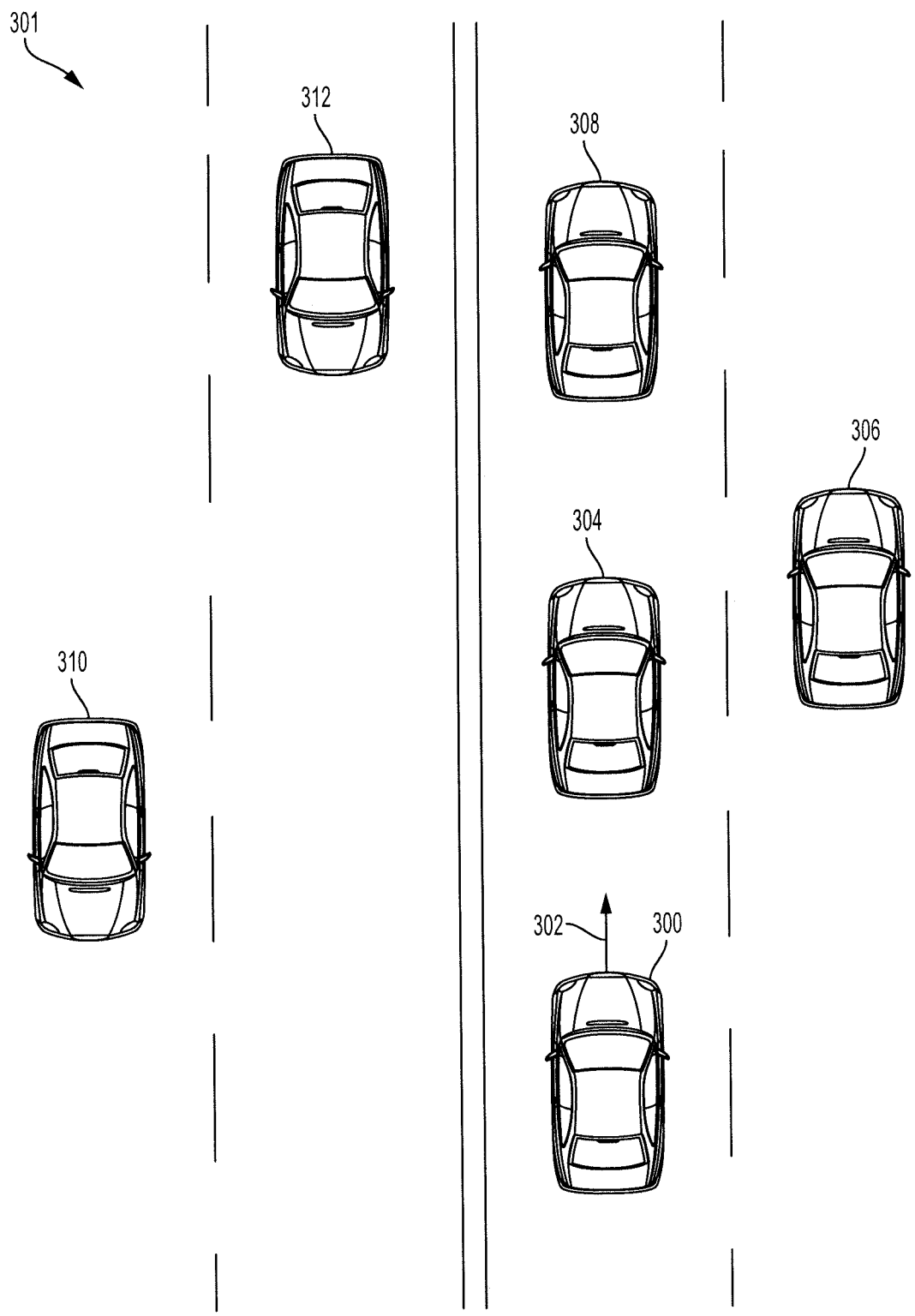
FIG. 3 is a drawing illustrating an exemplary use of the method of FIG. 2 according to an embodiment of the present invention.

With reference to FIG. 3, multiple vehicles are shown driving on a road 301. In particular, the multiple vehicles include a current vehicle 300 that may be performing a method similar to the method 200 of FIG. 2. The remaining vehicles may be detected by a distance sensor of the current vehicle 300. The ECU of the current vehicle 300 may select a reference vehicle from the remaining vehicles based on one or more of the parameters discussed with reference to block 206 of FIG. 2.

In particular, the ECU of the current vehicle 300 may consider a second vehicle 304, a third vehicle 306, and a fourth vehicle 308 to be potential reference vehicles because they are traveling in a same direction as the current vehicle 300 and are located in front of the current vehicle 300. Accordingly, a fifth vehicle 310 and a sixth vehicle 312 may be eliminated because they are traveling in an opposite direction from the current vehicle 300.

In some embodiments, the ECU of the current vehicle 300 may eliminate the third vehicle 306 because it is in a different lane than the current vehicle 300. Elimination of the third vehicle 306 may be desirable because occasionally cars in different lanes of traffic may behave differently.

In some embodiments, the ECU of the current vehicle 300 may select the fourth vehicle 308 as the reference vehicle because the fourth vehicle 308 is farther ahead of the current vehicle 300 than the remaining vehicles. This may be beneficial because the current vehicle 300 may have a greater amount of time in which to take action regarding the prediction if the prediction is based on the fourth vehicle 308.

In some situations, the current vehicle 300 may be unable to continuously detect a distance between the current vehicle 300 and the fourth vehicle 308. In that regard, the current vehicle 300 may select the second vehicle 304 as the reference vehicle because the second vehicle 304 is in the same lane as the current vehicle 300, is in front of the current vehicle 300, and the current vehicle 300 may continuously detect distance data regarding the second vehicle 304.

Returning reference to FIG. 2 and in block 208, the distance sensor of the current vehicle may continuously or periodically detect distance measurements from the current vehicle to the reference vehicle. For example, the distance sensor may periodically detect a distance measurement such as once per second, twice per second, 5 times per second, once every two seconds, or the like.

In block 210, the speed sensor of the current vehicle may detect a current speed of the current vehicle. For example, a GPS sensor, an IMU sensor, or another speed sensor may be used to detect data corresponding to the current vehicle speed.

In block 212, the ECU of the current vehicle may determine a reference vehicle speed of the reference vehicle based on the current vehicle speed and the multiple distance measurements. For example, the ECU of the current vehicle may determine that the reference vehicle speed is the same as the current vehicle speed if the multiple distance measurements remain at relatively the same value. For example, if the current vehicle speed is 60 mph and the reference vehicle remains 10 yards away from the current vehicle then the ECU may determine that the reference vehicle speed is 60 mph.

If the distance measurements become reduced in value then the ECU may determine that the reference vehicle speed is less than the current vehicle speed. For example, if the distance between the current vehicle and the reference vehicle decreases while the current vehicle speed remains the same, then the ECU may determine that the reference vehicle speed is less than the current vehicle speed. The ECU may determine the reference vehicle speed of the reference vehicle based on the rate of the decrease of distance between the current vehicle and the reference vehicle.

Likewise, if the distance measurements increase in value then the ECU may determine that the reference vehicle speed is greater than the current vehicle speed. The ECU may determine the reference vehicle speed of the reference vehicle based on the rate of increase of distance between the current vehicle and the reference vehicle. The ECU may take a similar approach when the current vehicle is accelerating or decelerating by comparing the current speed, the acceleration or deceleration rate of the current vehicle, and the multiple distance measurements.

In block 214, the ECU of the current vehicle may determine an acceleration rate or a deceleration rate of the reference vehicle. The ECU may determine the acceleration rate or the deceleration rate based on multiple determinations of the reference vehicle speed of the reference vehicle. The ECU may compare the multiple determinations of the reference vehicle speed to determine whether the reference vehicle is accelerating or decelerating. For example, the ECU may determine that a first reference vehicle speed is 60 mph, a second reference vehicle speed one second later is 55 mph, and a third reference vehicle speed another second later is 50 mph. Based on this determination, the ECU may determine that the reference vehicle is decelerating at a rate of 5 mph per second.

In some embodiments, the ECU may determine the acceleration rate or the deceleration rate of the reference vehicle based on the multiple distance measurements between the current vehicle and the reference vehicle. The ECU may analyze the multiple distance measurements and the time between the distance measurements, along with the current vehicle speed, to determine the acceleration rate or the deceleration rate of the reference vehicle.

In some embodiments, the current vehicle may receive the acceleration rate or the deceleration rate of the reference vehicle via a V2V network access device. The reference vehicle may transmit information which may be received by the V2V network access device of the current vehicle. The reference vehicle may also transmit information such as GPS coordinates of the reference vehicle and a heading of the reference vehicle. The current vehicle may receive and analyze the GPS coordinates and/or the heading of the reference vehicle to determine whether the reference vehicle is an acceptable reference vehicle. The ECU may use factors similar to those discussed above with reference to block 206. If the reference vehicle is an acceptable reference vehicle then the ECU may determine the acceleration rate or the deceleration rate of the reference vehicle based on the received information.

The memory of the current vehicle may store additional data that is usable to predict a forthcoming acceleration or deceleration of the current vehicle. For example, the memory of the current vehicle may store data corresponding to previously detected driver behavior such as average acceleration rates of the driver, average deceleration rates of the driver, driver behavior in different situations such as entering a highway on-ramp or approaching a stop light or stop sign.

The memory may also store information corresponding to the capabilities of the current vehicle. For example, the memory may store a maximum acceleration rate of the current vehicle, a maximum speed of the current vehicle, or the like.

In block 220, the memory may also store previously learned acceleration rates or deceleration rate corresponding to particular locations. For example, the memory may store data indicating that the current vehicle typically accelerates at 5 mph per second when departing a specific stop sign, typically accelerates at 10 mph per second when entering a specific highway on-ramp, and the like. The previously learned acceleration rates or deceleration rates stored in block 220 may differ from the driver behavior that is stored in block 218 as the driver behavior corresponds to general tendencies of the driver and the previously learned acceleration rates or deceleration rates correspond to data detected at specific locations.

In block 222, the ECU of the current vehicle may predict a forthcoming acceleration rate or a forthcoming deceleration rate of the current vehicle. The ECU may make this prediction based on one or more of the determined acceleration rate or deceleration rate of the reference vehicle, the stored driver behavior, the capabilities of the current vehicle, or the learned acceleration rates or deceleration rates for specific locations. For example, the ECU may predict that the current vehicle will accelerate or decelerate at a similar rate as the reference vehicle.

Figure 4:
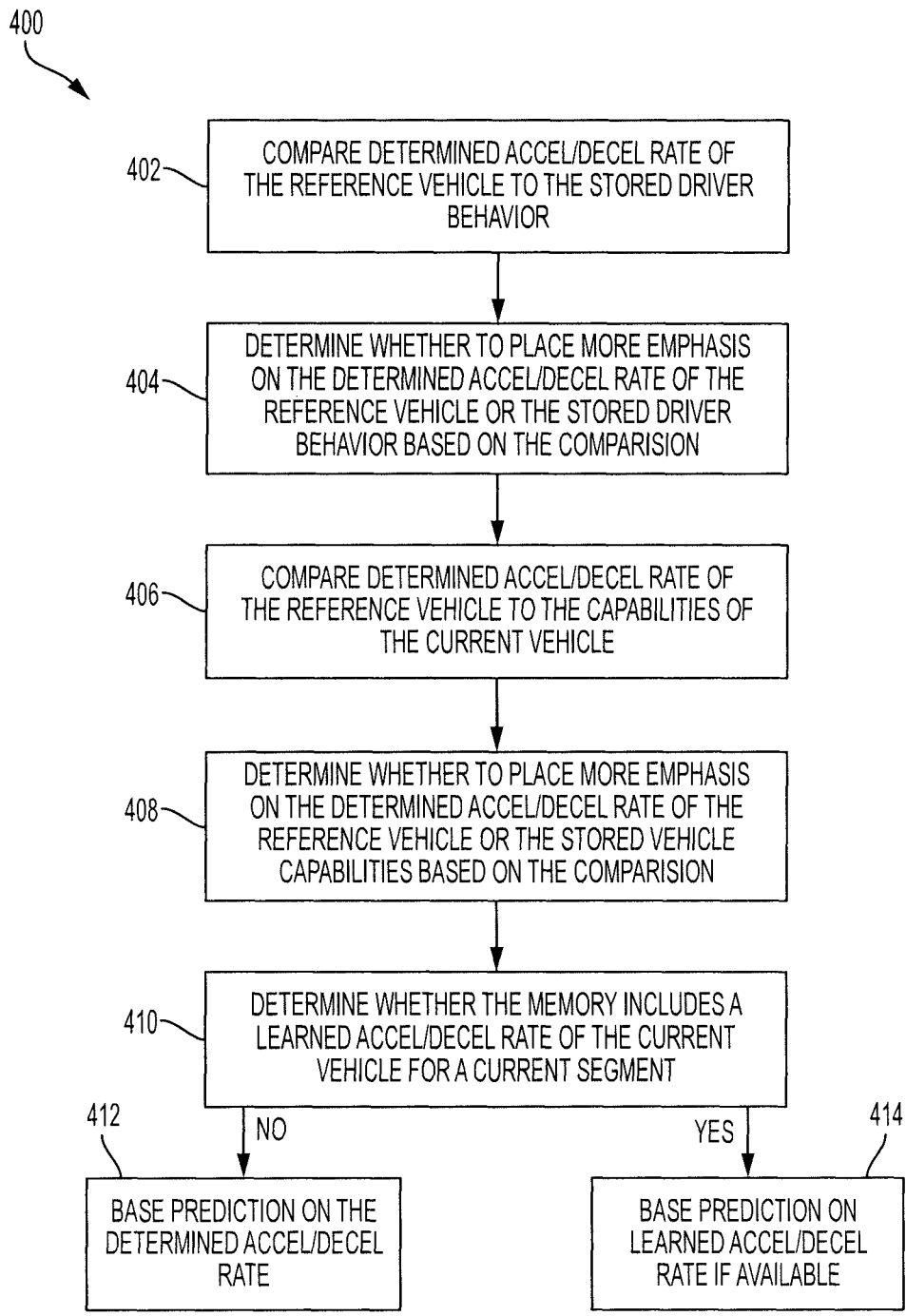
FIG. 4 is a flowchart illustrating a method for predicting a forthcoming acceleration of a current vehicle based on operation of a nearby reference vehicle, previously detected driver behavior, and capabilities of the current vehicle according to an embodiment of the present invention.

Referring to FIG. 4, another flowchart illustrates a method 400 for predicting a forthcoming acceleration rate or deceleration rate of the current vehicle. The method 400 is used to predict the forthcoming acceleration rate or deceleration rate based on the determined acceleration rate or deceleration rate of the reference vehicle, the stored driver behavior, the capabilities of the current vehicle, and the learned acceleration rate or deceleration rates for a current road segment.

In block 402, the ECU may compare the determined acceleration rate or deceleration rate of the reference vehicle to the stored driver behavior. In particular, the ECU may compare this information to determine whether the stored driver behavior indicates that the driver is unlikely to accelerate or decelerate in a similar manner as the reference vehicle.

In block 404, the ECU may determine whether to place more emphasis on the determined acceleration rate or deceleration rate of the reference vehicle or on the stored driver behavior based on the comparison. For example, if the driver typically accelerates at a rate of 5 mph per second on a highway on-ramp and the reference vehicle is accelerating at 10 mph per second, then the ECU of the current vehicle may determine to place more emphasis on the stored driver behavior. This is because it may be unlikely that the driver will accelerate at a rate twice that of his normal preference.

As another example, if the driver typically accelerates at a rate of 10 mph per second on a highway on-ramp and the reference vehicle is accelerating at 5 mph per second then the ECU may determine to place more emphasis on the determined acceleration rate of the reference vehicle. This is because the driver will be unable to accelerate at his preferred acceleration rate because the reference vehicle will prevent such acceleration.

As yet another example, if the driver behavior is relatively similar to that of the reference vehicle, or the driver behavior cannot be equated to the current situation, then the ECU may predict that the current vehicle will accelerate at the same or a similar rate as the reference vehicle.

In block 406, the ECU may compare the determined acceleration rate or deceleration rate of the reference vehicle to the capabilities of the current vehicle. For example, the ECU may compare this information to determine whether the current vehicle is capable of accelerating or decelerating at a similar rate as the reference vehicle.

In block 408, the ECU may determine whether to place more emphasis on the determined acceleration rate or deceleration rate of the reference vehicle or on the stored vehicle capabilities based on the comparison. For example, if the reference vehicle is accelerating at 10 mph per second and the current vehicle is only capable of accelerating at 5 mph per second, then the ECU may predict that the current vehicle will accelerate at 5 mph per second or less.

As another example, if the reference vehicle is accelerating at 5 mph per second and the current vehicle is capable of accelerating at 10 mph per second then the ECU may predict that the current vehicle will accelerate at the 5 mph per second acceleration rate of the reference vehicle. This is because the capabilities of the current vehicle do not limit the current vehicle from accelerating at the same rate as the reference vehicle.

In block 410, the ECU may determine whether the memory includes a learned acceleration rate or deceleration rate of the current vehicle for a current road segment. For example, if the vehicle has previously traveled along the road segment, the memory may include stored data indicating that the acceleration rate or deceleration of the vehicle on the current segment. In some embodiments, the ECU may not consider a previously detected acceleration rate or deceleration rate to be learned until the vehicle has traveled on the segment multiple times.

For example, the current vehicle may have traveled on a current road segment 3 times, and the ECU may require 5 iterations in order for a previously detected acceleration rate or deceleration rate to be considered to be learned. In that regard, the ECU may determine that there is no learned acceleration rate or deceleration rate of the current vehicle for the current segment. As another example, the vehicle may have traveled along the segment 6 times with an average acceleration of 5 mph per second. In that regard, the ECU may determine that there is a learned acceleration rate of 5 mph per second of the current vehicle for the current segment.

In block 412, if there is no learned acceleration rate or deceleration rate, then the ECU may base the prediction of the forthcoming acceleration rate or deceleration rate on the determined acceleration rate or deceleration rate of the reference vehicle. On the other hand and in block 414, if there is a learned acceleration rate or deceleration rate, then the ECU may base the prediction of the forthcoming acceleration rate or deceleration rate on the learned acceleration rate or deceleration rate.

In some embodiments, the ECU may predict the forthcoming acceleration rate or deceleration rate of the current vehicle based on the learned acceleration rate or deceleration rate when the learned deceleration rate is less than the determined acceleration rate or deceleration rate of the reference vehicle. This may be because the reference vehicle prevents the driver from accelerating at his preferred acceleration rate which has been learned for the location.

Similarly and in some embodiments, the ECU may predict the forthcoming acceleration rate or deceleration rate of the current vehicle based on the determined acceleration rate or deceleration rate of the reference vehicle when the learned deceleration rate is greater than the determined acceleration rate or deceleration rate of the reference vehicle. This may be because the reference vehicle fails to prevent the driver from accelerating or decelerating at his preferred rate.

In some embodiments, the ECU may predict the forthcoming acceleration rate or deceleration rate of the current vehicle based on information publicly available. For example, this information may include speed limits of the roads traveled on (which may be downloaded by a GPS unit or otherwise received from a remote source, or speed limit signs may be detected by a camera of the current vehicle). This information may also include received traffic information, road condition data (such as whether it is raining, snowing, or the like), whether potholes exist in the road, or the like.

This publicly available information may be handled in a similar manner as the stored driver behavior. For example, the ECU may predict the forthcoming acceleration rate or deceleration rate of the current vehicle based on a speed limit of the road instead of the acceleration rate or deceleration rate of the reference vehicle if the current vehicle speed will be substantially greater than the speed limit if the prediction is based on the acceleration rate of the reference vehicle.

Returning reference to FIG. 2, the ECU may periodically or continuously predict the forthcoming acceleration rate or deceleration rate of the current vehicle for an upcoming prediction window. In some embodiments, the upcoming prediction window may correspond to a set period of time such as 10 seconds, 15 seconds, 30 seconds, or the like. In some embodiments, the upcoming prediction window may correspond to an amount of time for the current vehicle to reach a current location of the reference vehicle. For example, the reference vehicle may be a quarter of a mile ahead of the current vehicle and the current vehicle may be traveling at 60 mph. In that regard, the ECU may determine a prediction window of 15 seconds because that is the amount of time it will take for the current vehicle to reach the current location of the reference vehicle.

The ECU may continuously update the prediction for the prediction window as the reference vehicle continues to accelerate or decelerate. For example, the current vehicle may initially determine that the reference vehicle is accelerating at 5 mph per second. The ECU of the current vehicle may predict that the current vehicle will accelerate at the same rate for the duration of the prediction window. A few seconds later, the reference vehicle may cease accelerating. At this point, the ECU of the current vehicle may make a new prediction for a current prediction window. The new prediction may be that the current vehicle will accelerate for a few seconds and then cease accelerating.

In block 226, the ECU may change operation of the power source to increase efficiency of the power source based on the predicted acceleration rate or deceleration rate of the current vehicle.

Referring to FIG. 1 and as an example of changing operation of the power source to increase efficiency of the power source, the engine 112 may have an optimal setting at which it may perform most efficiently. For example, the optimal setting may include an optimal engine speed and an optimal torque. The ECU 102 may predict that the vehicle will accelerate to 65 mph based on a determined acceleration rate of a reference vehicle. In that regard, the ECU 102 may control the engine 112 to turn on and operate at the optimal engine speed and torque before the predicted acceleration begins. Such operation of the engine 112 may provide more power than necessary for the present operation, and the extra power may be used to charge the battery 114.

Accordingly, when the acceleration begins, the engine 112 may continue to operate at the optimal engine speed and torque and the remaining power for the acceleration may be provided by the motor-generator 116 using energy stored in the battery 114. Because the engine 112 is continuously operating at the most efficient engine speed and torque, the total efficiency of the vehicle 100 is improved.

As another example, the ECU may predict that the current vehicle 100 will decelerate to 0 mph based on a determined deceleration of a reference vehicle. The ECU 102 may control the engine 112 to turn off and to allow the battery 114 alone to power the vehicle towards the stop in order to increase efficiency of the power source. This may be beneficial as the deceleration may allow the motor generator 116 to generate energy to be stored in the battery 114 without using any fuel.

As another example, the ECU 102 may predict that the current vehicle 100 will accelerate at a relatively low acceleration rate from a stop. In that regard, the ECU may control the transmission 118 to begin the acceleration in second gear instead of first gear because the additional power provided by use of the first gear is unnecessary and acceleration in second gear is more fuel-efficient than acceleration in first gear.

As yet another example, the ECU 102 may predict that the current vehicle 100 will accelerate within a predetermined amount of time. In preparation of the forthcoming acceleration, the ECU 102 may modify the boost converter control of the battery 114 to increase the voltage. This voltage increase may allow the battery 114 to more efficiently power the current vehicle 100 through the acceleration.

As another example, the battery 114 may have an available power limit threshold that corresponds to a maximum amount of power that may be provided by the battery 114, and a charge rate threshold that corresponds to a maximum amount of charge that the battery 114 may receive. In response to predicting a forthcoming acceleration, the ECU 102 may control the battery 114 to increase the available power limit threshold to allow the battery 114 to more efficiently power the current vehicle 100 through the acceleration. In response to predicting a forthcoming deceleration, the ECU 102 may control the battery 114 to increase the charge rate threshold to allow more energy received via regenerative braking to be provided to the battery 114.

Returning reference to FIG. 2 and in some embodiments, the ECU may predict a forthcoming energy usage of the current vehicle instead of a forthcoming acceleration rate or deceleration rate of the current vehicle. In that regard, the ECU may utilize the determined acceleration rate or deceleration rate of the reference vehicle to predict a forthcoming power consumption of the current vehicle instead of predicting a forthcoming acceleration rate or deceleration rate. The steps for predicting the forthcoming power consumption may be similar to the steps for predicting the forthcoming acceleration rate or deceleration rate.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that scope shall not be restricted, except in light of the appended claims and their equivalents.

What is claimed is:

1. A system for increasing efficiency of a current vehicle, comprising:
   a power source configured to generate power to propel the current vehicle;
   a distance sensor configured to detect multiple distance measurements each corresponding to a distance from the current vehicle to a reference vehicle;
   a memory configured to store a learned acceleration rate or a learned deceleration rate corresponding to previously-detected acceleration rates or previously-detected deceleration rates of the current vehicle for a current road segment; and
   an electronic control unit (ECU) coupled to the power source, the distance sensor, and the memory, and configured to:
      determine an acceleration rate or a deceleration rate of the reference vehicle based on the multiple distance measurements,
      predict a forthcoming acceleration rate or a forthcoming deceleration rate of the current vehicle based on the determined acceleration rate or the determined deceleration rate of the reference vehicle when the stored learned acceleration rate or the stored learned deceleration rate is greater than the determined acceleration rate or the determined deceleration rate of the reference vehicle,
predict the forthcoming acceleration rate or the forthcoming deceleration rate of the current vehicle based on the stored learned acceleration rate or the stored learned deceleration rate when the stored learned acceleration rate or the stored learned deceleration rate is less than the determined acceleration rate or the determined deceleration rate of the reference vehicle, and
change operation of the power source to increase efficiency of the power source based on the predicted forthcoming acceleration rate or the predicted forthcoming deceleration rate of the current vehicle.

2. The system of claim 1 further comprising a speed sensor coupled to the ECU and configured to detect a current speed of the current vehicle, wherein the ECU is further configured to:
determine a reference vehicle speed of the reference vehicle based on the multiple distance measurements and the current speed of the current vehicle; and
determine the acceleration rate or the deceleration rate of the reference vehicle based on multiple determinations of the reference vehicle speed.

3. The system of claim 1 wherein the distance sensor is configured to detect presence of multiple vehicles and the ECU is configured to select the reference vehicle from the multiple vehicles based on at least one of the reference vehicle being in front of the current vehicle, the reference vehicle being in the same lane as the current vehicle, the reference vehicle traveling in a same direction as the current vehicle, the reference vehicle being farther in front of the current vehicle than each remaining vehicle of the multiple vehicles, or the distance sensor being able to continuously detect the multiple distance measurements corresponding to the reference vehicle.

4. The system of claim 1 wherein:
the memory is further configured to store at least one of driver behavior of a driver of the current vehicle or capabilities of the power source of the current vehicle, and
the ECU is further configured to predict the forthcoming acceleration rate or the forthcoming deceleration rate of the current vehicle further based on the at least one of the stored driver behavior of the driver of the current vehicle or the stored capabilities of the power source of the current vehicle.

5. The system of claim 1 further comprising a vehicle-to-vehicle (V2V) network access device coupled to the ECU and configured to receive a current acceleration rate or a current deceleration rate of the reference vehicle from the reference vehicle, wherein the ECU is further configured to predict the forthcoming acceleration rate or the forthcoming deceleration rate of the current vehicle based on the received current acceleration rate or the received current deceleration rate of the reference vehicle.

6. The system of claim 1 wherein the ECU is further configured to continuously or periodically predict the forthcoming acceleration rate or the forthcoming deceleration rate of the current vehicle for a prediction window corresponding to a future predetermined amount of time.

7. The system of claim 1 wherein the ECU is further configured to predict a forthcoming energy usage of the current vehicle based on the determined acceleration rate or the determined deceleration rate of the reference vehicle and to change the operation of the power source based on the predicted forthcoming energy usage of the current vehicle.

8. The system of claim 1 wherein at least one of:
the power source includes an engine and a transmission and the ECU is configured to change the operation of the power source by controlling the transmission to shift to a new gear ratio that is more efficient than a current gear ratio for the predicted forthcoming acceleration rate or the predicted forthcoming deceleration rate;
the power source includes the engine, a motor-generator, and a battery and the ECU is configured to change the operation of the power source by controlling the engine to turn on or off to charge the battery or to use the battery to propel the current vehicle, respectively, to increase efficiency of the power source for the predicted forthcoming acceleration rate or the predicted forthcoming deceleration rate; or the power source includes the motor-generator and the battery and the ECU is configured to change the operation of the power source by controlling the battery to increase an available power limit threshold or to increase a charge rate threshold to increase efficiency of the power source for the predicted forthcoming acceleration rate or the predicted forthcoming deceleration rate.

9. A method for increasing efficiency of a current vehicle, comprising:
generating, by a power source, power to propel the current vehicle;
detecting, by a distance sensor, multiple distance measurements each corresponding to a distance from the current vehicle to a reference vehicle;
storing, by a memory, a learned acceleration rate or a learned deceleration rate corresponding to previously-detected acceleration rates or previously-detected deceleration rates of the current vehicle for a current road segment;
determining, by the ECU, an acceleration rate or a deceleration rate of the reference vehicle based on the multiple distance measurements;
predicting, by the ECU, a forthcoming acceleration rate or a forthcoming deceleration rate of the current vehicle based on the determined acceleration rate or the determined deceleration rate of the reference vehicle when the stored learned acceleration rate or the stored learned deceleration rate is greater than the determined acceleration rate or the determined deceleration rate of the reference vehicle;
predicting, by the ECU, the forthcoming acceleration rate or the forthcoming deceleration rate of the current vehicle based on the stored learned acceleration rate or the stored learned deceleration rate when the stored learned acceleration rate or the stored learned deceleration rate is less than the determined acceleration rate or the determined deceleration rate of the reference vehicle; and
changing, by the ECU, operation of the power source to increase efficiency of the power source based on the predicted forthcoming acceleration rate or the predicted forthcoming deceleration rate of the current vehicle.

10. The method of claim 9 further comprising:
detecting, by the distance sensor, presence of multiple vehicles; and
selecting, by the ECU, the reference vehicle from the multiple vehicles based on at least one of the reference vehicle being in front of the current vehicle, the reference vehicle being in the same lane as the current vehicle, the reference vehicle traveling in a same direction as the current vehicle, the reference vehicle being farther in front of the current vehicle than each remaining vehicle of the multiple vehicles, or the distance sensor being able to continuously detect the multiple distance measurements corresponding to the reference vehicle.

11. The method of claim 9 further comprising:
storing, by the memory, at least one of driver behavior of a driver of the current vehicle or capabilities of the power source of the current vehicle; and
predicting, by the ECU, the forthcoming acceleration rate or the forthcoming deceleration rate of the current vehicle further based on the at least one of the stored driver behavior of the driver of the current vehicle or the stored capabilities of the power source of the current vehicle.

12. The method of claim 9 further comprising:
receiving, by a vehicle-to-vehicle (V2V) network access device, a current acceleration rate or a current deceleration rate of the reference vehicle from the reference vehicle; and
predicting, by the ECU, the forthcoming acceleration rate or the forthcoming deceleration rate of the current vehicle based on the received current acceleration rate or the received current deceleration rate of the reference vehicle.

13. The method of claim 9 further comprising:
detecting, by a speed sensor, a current speed of the current vehicle;
determining, by an electronic control unit (ECU), a reference vehicle speed of the reference vehicle based on the multiple distance measurements and the current speed of the current vehicle; and
determining, by the ECU, the acceleration rate or the deceleration rate of the reference vehicle based on multiple determinations of the reference vehicle speed.

14. The method of claim 9 further comprising:
predicting, by the ECU, a forthcoming energy usage of the current vehicle based on the determined acceleration rate or the determined deceleration rate of the reference vehicle; and
changing, by the ECU, the operation of the power source based on the predicted forthcoming energy usage of the current vehicle.

15. A system for increasing efficiency of a current vehicle, comprising:
a power source configured to generate power to propel the current vehicle;
a vehicle-to-vehicle (V2V) network access device configured to receive a current acceleration rate or a current deceleration rate of a reference vehicle from the reference vehicle;
a memory configured to store a learned acceleration rate or a learned deceleration rate corresponding to previously-detected acceleration rates or previously-detected deceleration rates of the current vehicle for a current road segment; and
an electronic control unit (ECU) coupled to the power source, the V2V network access device, and the memory, and configured to:
predict a forthcoming acceleration rate or a forthcoming deceleration rate of the current vehicle based on the received current acceleration rate or the received current deceleration rate of the reference vehicle when the stored learned acceleration rate or the stored learned deceleration rate is greater than the received current acceleration rate or the received current deceleration rate of the reference vehicle,
predict the forthcoming acceleration rate or the forthcoming deceleration rate of the current vehicle based on the stored learned acceleration rate or the stored learned deceleration rate when the stored learned acceleration rate or the stored learned deceleration rate is less than the received current acceleration rate or the received current deceleration rate of the reference vehicle, and
change operation of the power source to increase efficiency of the power source based on the predicted forthcoming acceleration rate or the predicted forthcoming deceleration rate of the current vehicle.

16. The system of claim 15 wherein:
the memory is further configured to store at least one of driver behavior of a driver of the current vehicle or capabilities of the power source of the current vehicle, and
the ECU is further configured to predict the forthcoming acceleration rate or the forthcoming deceleration rate of the current vehicle based on the received current acceleration rate or the received current deceleration rate of the reference vehicle and the at least one of the stored driver behavior of the driver of the current vehicle or the stored capabilities of the power source of the current vehicle.

17. The system of claim 15 wherein the ECU is further configured to predict a forthcoming energy usage of the current vehicle based on the received current acceleration rate or the received current deceleration rate of the reference vehicle and to change the operation of the power source based on the predicted forthcoming energy usage of the current vehicle.

18. A system for increasing efficiency of a current vehicle, comprising:
a memory configured to store a learned acceleration rate or a learned deceleration rate corresponding to previously-detected acceleration rates or previously-detected deceleration rates of the current vehicle for a current road segment; and
an electronic control unit (ECU) coupled to the memory and configured to:
determine or receive a determined acceleration rate or a deceleration rate of the reference vehicle,
predict a forthcoming acceleration rate or a forthcoming deceleration rate of the current vehicle based on the stored learned acceleration rate or the stored learned deceleration rate instead of the determined acceleration rate or the determined deceleration rate of the reference vehicle when the stored learned acceleration rate or the stored learned deceleration rate is less than the determined acceleration rate or the determined deceleration rate of the reference vehicle, and
predict the forthcoming acceleration rate or the forthcoming deceleration rate of the current vehicle based on the determined acceleration rate or the determined deceleration rate of the reference vehicle instead of the stored learned acceleration rate or the stored learned deceleration rate when the stored learned acceleration rate or the stored learned deceleration rate is greater than the determined acceleration rate or the determined deceleration rate of the reference vehicle.

19. The system of claim 18 wherein the ECU is further configured to continuously or periodically predict the forthcoming acceleration rate or the forthcoming deceleration rate of the current vehicle for a prediction window corresponding to a future predetermined amount of time.

20. The system of claim 18 further comprising a power source configured to generate power to propel the current vehicle, wherein the ECU is further configured to predict a forthcoming energy usage of the current vehicle based on the determined acceleration rate or the determined deceleration rate of the reference vehicle and to change the operation of the power source based on the predicted forthcoming energy usage of the current vehicle.

21. The system of claim 18 further comprising a power source configured to generate power to propel the current vehicle, wherein the ECU is further configured to change operation of the power source to increase efficiency of the power source based on the predicted forthcoming acceleration rate or the predicted forthcoming deceleration rate of the current vehicle.

22. The system of claim 21 wherein the memory is further configured to store at least one of driver behavior of a driver of the current vehicle or capabilities of the power source of the current vehicle, wherein the ECU is further configured to predict the forthcoming acceleration rate or the forthcoming deceleration rate of the current vehicle based on the determined acceleration rate or the determined deceleration rate of the reference vehicle and the at least one of the stored driver behavior of the driver of the current vehicle or the stored capabilities of the power source of the current vehicle.

\* \* \* \* \*